(12) United States Patent
Kuboyama et al.

(10) Patent No.: US 8,684,385 B2
(45) Date of Patent: Apr. 1, 2014

(54) STEERING DAMPER DEVICE FOR SADDLE RIDING VEHICLE

(75) Inventors: Hirotsugu Kuboyama, Wako (JP); Kazuhiko Gogo, Wako (JP); Mikio Uchiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 12/984,119

(22) Filed: Jan. 4, 2011

(65) Prior Publication Data

US 2011/0175321 A1 Jul. 21, 2011

(30) Foreign Application Priority Data

Jan. 21, 2010 (JP) ................................. 2010-010838

(51) Int. Cl.
*B62K 21/08* (2006.01)
(52) U.S. Cl.
USPC ......................................................... 280/271
(58) Field of Classification Search
USPC ......................................................... 280/271
See application file for complete search history.

(56) References Cited

U.S. PATENT DOCUMENTS

| | | | | |
|---|---|---|---|---|
| 3,990,716 A | * | 11/1976 | Dows ............................ | 280/271 |
| 4,006,915 A | * | 2/1977 | Parker ........................... | 280/271 |
| 4,558,878 A | * | 12/1985 | Motrenec ....................... | 280/272 |
| 5,076,383 A | * | 12/1991 | Inoue et al. .................... | 180/417 |
| 2005/0151341 A1 | * | 7/2005 | Iwamoto et al. .............. | 280/272 |
| 2007/0095624 A1 | * | 5/2007 | Ito ................................. | 188/314 |

FOREIGN PATENT DOCUMENTS

| | | | | |
|---|---|---|---|---|
| DE | 2710651 | A | * | 9/1978 |
| EP | 900722 | A2 | * | 3/1999 |
| JP | 05201378 | A | * | 8/1993 |
| JP | 06099873 | A | * | 4/1994 |
| JP | 4206353 | B2 | | 4/2005 |
| JP | 2009-113679 | | | 5/2009 |

\* cited by examiner

*Primary Examiner* — Ruth Ilan
*Assistant Examiner* — Daniel Yeagley
(74) *Attorney, Agent, or Firm* — Ditthavong Mori & Steiner, P.C.

(57) ABSTRACT

A steering damper device for a saddle riding vehicle includes a tubular damper including a cylindrical damper cylinder and a piston rod slidably passed through the damper cylinder. Either the damper cylinder or the piston rod is supported on an upper frame or a down frame of the saddle riding vehicle. The upper frame extends rearwardly from a head pipe through which a steering shaft passes and which holds the steering shaft therein rotatably about an axis thereof. The down frame extends downwardly from the head pipe. The steering shaft rotates with a bottom bridge. The tubular damper is disposed such that an axis thereof is disposed on a vehicle width direction central plane. The tubular damper extends or contracts as the bottom bridge rotates. The tubular damper extends or contracts within a space between the upper frame and the down frames in a side view.

8 Claims, 6 Drawing Sheets

STEERING DAMPER DEVICE FOR SADDLE RIDING VEHICLE

CROSS-REFERENCE TO RELATED APPLICATIONS

The present application claims priority under 35 U.S.C. §119 to Japanese Patent Application No. 2010-010838, filed Jan. 21, 2010. The contents of this application are incorporated herein by reference in their entirety.

BACKGROUND OF THE INVENTION

1. Field of the Invention

The present invention relates to a steering damper device for a saddle riding vehicle.

2. Discussion of the Background

A known steering damper device for a saddle riding type vehicle having a steering system rotatably supported on a head pipe of a vehicle body frame includes a tubular damper disposed immediately before the head pipe so as to extend therealong. The tubular damper has a lower end portion oscillatably mounted on a bottom bridge and an upper end portion oscillatably mounted on the head pipe. The tubular damper is adapted to extend or contract along the head pipe when the steering system is turned clockwise or counterclockwise from the position of a steering angle of 0 degrees (a vehicle's straight-ahead position) (see, for example, Japanese Patent No. 4206353). According to the foregoing arrangement, disposing the tubular damper immediately before the head pipe so as to extend therealong allows a damping force to be efficiently given to rotation of the steering system.

Another known arrangement has a tubular damper disposed on one side of a down frame that extends downwardly from a head pipe, so as to extend therealong adjacent thereof. The tubular damper has an intermediate portion oscillatably journaled on the down frame and an upper end portion connected to a bottom bridge via a linkage mechanism (see, for example, Japanese Patent Laid-Open No. 2009-113679).

The former arrangement described above, in which the tubular damper is disposed forwardly of the head pipe, poses a problem in that it is difficult to allow a clearance when a vehicle component, such as a headlight, is disposed forwardly of the head pipe.

On the other hand, the latter arrangement described above, in which the tubular damper is disposed sideways the down frame, poses a problem in that a difference is involved in the damping force given during clockwise or counterclockwise rotation of the steering system between the clockwise and counterclockwise rotation, which produces a change in damping characteristics.

SUMMARY OF THE INVENTION

According to one aspect of the present invention, a steering damper device is for a saddle riding vehicle. The steering damper device gives a damping force to rotate a steering shaft of the saddle riding vehicle. The steering damper device includes a tubular damper. The tubular damper includes a cylindrical damper cylinder and a piston rod slidably passed through the damper cylinder. Either the damper cylinder or the piston rod is supported on an upper frame or a down frame of the saddle riding vehicle. The upper frame extends rearwardly from a head pipe. The steering shaft passes through the head pipe. The head pipe holds the steering shaft therein rotatably about an axis of the steering shaft. The down frame extends downwardly from the head pipe. The steering shaft rotates with a bottom bridge. The tubular damper is disposed such that an axis thereof is disposed on a vehicle width direction central plane. The tubular damper extends or contracts as the bottom bridge rotates. The tubular damper extends or contracts within a space between the upper frame and the down frames in a side view.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
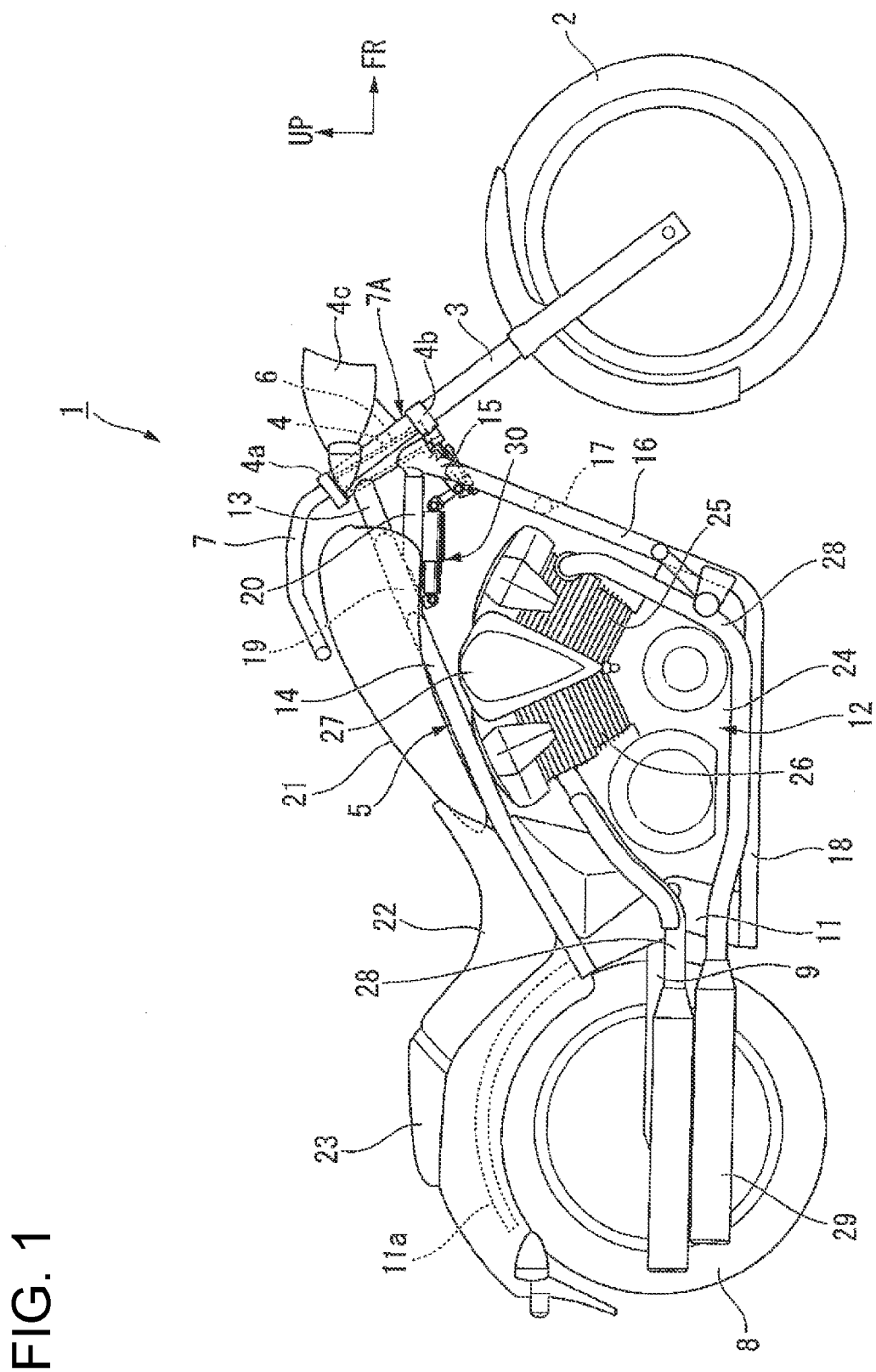
FIG. 1 is a right side elevational view showing a motorcycle according to an embodiment of the present invention.

The embodiments of the present invention will be described below with reference to the accompanying drawings, wherein like reference numerals designate corresponding or identical elements throughout the various drawings. Throughout the descriptions given hereunder, expressions indicating directions including front and rear, and right and left, mean the same directions as those in a vehicle unless otherwise specified. In the drawings, an arrow FR indicates forward of the vehicle, an arrow LH indicates leftward of the vehicle, and an arrow UP indicates upward of the vehicle.

[First Embodiment]

A motorcycle 1 shown in FIG. 1 is a so-called American type (cruiser type) vehicle having a large caster angle and a low and long vehicle body. The motorcycle 1 has a front wheel 2 journaled at a lower end portion of a pair of left and right front forks 3. The front forks 3 have upper portions pivoted steerably by a head pipe 6 at a front end portion of a vehicle body frame 5 via a stem pipe (steering stem) 4.

The head pipe 6 and the stem pipe 4 each have a cylindrical shape and are coaxial with each other. The head pipe 6 and the stem pipe 4 are disposed in an inclined position in a side view such that a central axis thereof (axis) C1 is disposed on a vehicle width direction central plane CS (vehicle body crosswise central plane) (see FIGS. 2 and 5) and upper portions thereof are disposed rearwardly. The stem pipe 4 is passed through and held in the head pipe 6 rotatably about the axis C1.

The stem pipe 4 have upper and lower end portions, to which a top bridge 4a and a bottom bridge 4b have their crosswise intermediate portions fixed, respectively. The top bridge 4a and the bottom bridge 4b are placed across upper portions of the left and right front forks 3. The top bridge 4a supports a steering handlebar 7. The handlebar 7, the left and right front forks 3, the stem pipe 4, the top bridge 4a, and the bottom bridge 4b constitute a front wheel steering system (hereinafter referred to simply as a steering system) 7A. The steering system 7A is supported by the head pipe 6 rotatably in clockwise and counterclockwise directions (steerably) about the axis C1. In FIG. 1, reference numeral 4c denotes a headlight that is supported, for example, on the bottom bridge 4b and protrudes forwardly of the head pipe 6.

The motorcycle 1 includes a rear wheel 8 that is journaled at a rear end portion of a swing arm 9 extending longitudinally at a lower side in a rear portion of the vehicle body. The swing arm 9 has a front end portion that is pivoted on left and right pivot brackets 11 at a lower portion of the vehicle body frame 5 swingably in a vertical direction.

The vehicle body frame 5 is a cradle type that includes steels of several different types joined together through, for example, welding and surrounds an engine 12 mounted substantially at a center of the vehicle body.

Specifically, the vehicle body frame 5 mainly includes an upper pipe 13, left and right rear upper pipes 14, a frame connecting member 15, left and right down pipes 16, a cross pipe 17, left and right lower pipes 18, left and right pivot brackets 11, a gusset member 19, and a sub-upper pipe 20. The upper pipe 13 extends obliquely downwardly toward the rear with a relatively mild inclination from a rear side of an upper portion of the head pipe 6. The left and right rear upper pipes 14 branch to the left and right, respectively, from a rear end portion of the upper pipe 13 to extend rearwardly. The frame connecting member 15 is joined to a rear side of a lower portion of the head pipe 6. The left and right down pipes 16 branch to the left and right, respectively, from a lower portion of the frame connecting member 15 and extend obliquely downwardly toward the rear with a relatively sharp inclination. The cross pipe 17 extends across upper portions of the left and right down pipes 16. The left and right lower pipes 18 curve to extend rearwardly from lower end portions of the down pipes 16. The left and right pivot brackets 11 each extend across a rear end portion of the lower pipe 18 on either side and a rear end portion of the rear upper pipe 14 on either side. The gusset member 19 extends across a rear end portion of the upper pipe 13 and a front end portion of each of the left and right rear upper pipes 14. The sub-upper pipe 20 extends across a rear portion of the frame connecting member 15 and a rear side of a rear portion of the upper pipe 13.

Figure 2:
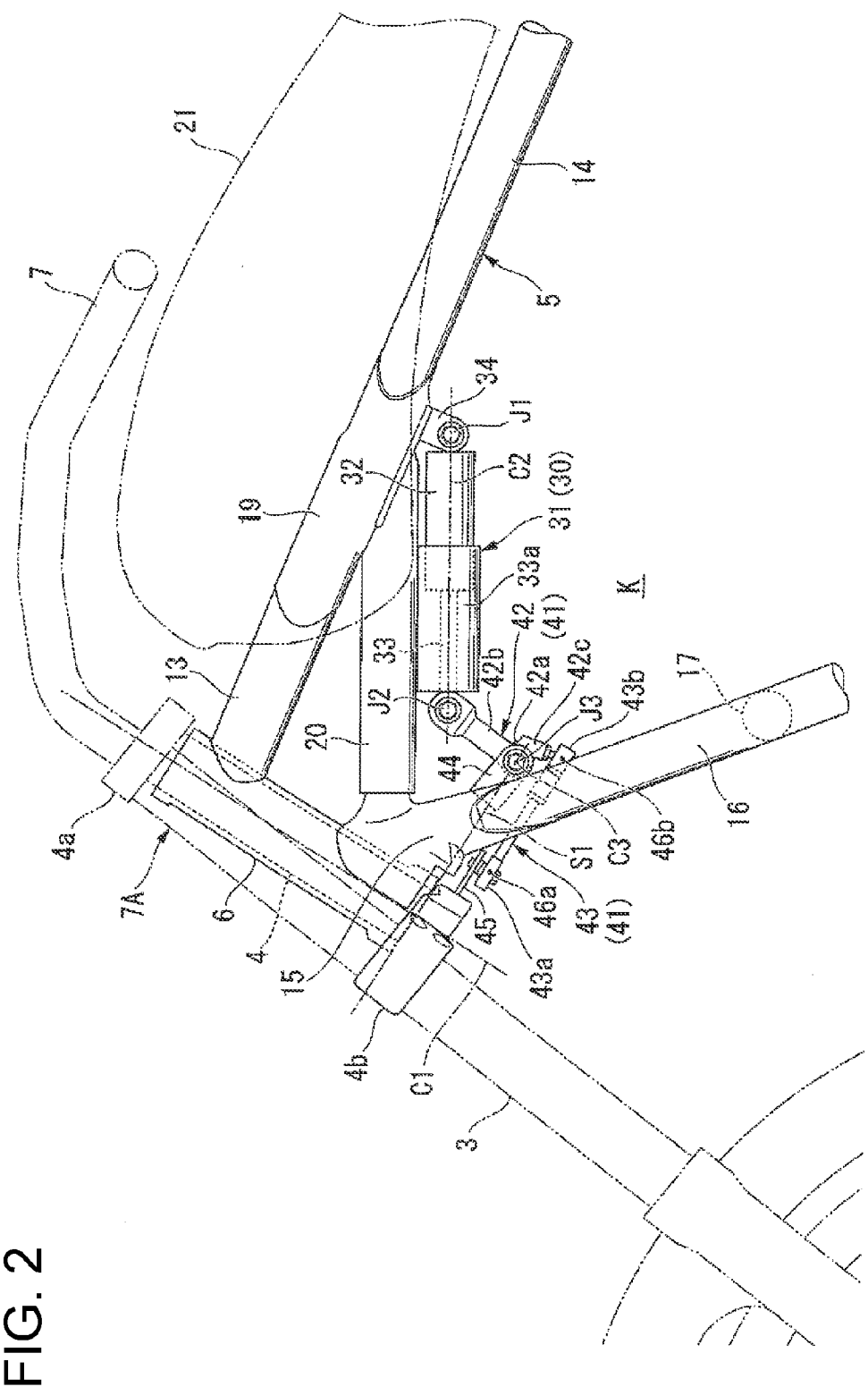
FIG. 2 is a left side elevational view showing a steering damper and parts disposed therearound in a condition of a steering angle of 0 degrees in the motorcycle.

Referring to FIGS. 1 and 2, the head pipe 6 is formed of cylindrical steel disposed in an inclined position, having an axial upper side disposed rearwardly. The stem pipe 4 is coaxially passed through and held in the head pipe 6. Note that, in the motorcycle 1, the head pipe 6 has an inclination angle relative to a vertical direction (the caster angle) slightly smaller than an inclination angle of the front forks 3 relative to the vertical direction. Trail can thereby be inhibited from becoming large.

The upper pipe 13 is formed of, for example, a round steel pipe and disposed singly at the vehicle width direction center (vehicle body crosswise center). Specifically, the upper pipe 13 is disposed such that a central axis thereof (not shown) is located on the vehicle width direction central plane CS. The left and right rear upper pipes 14 formed, for example, of round steel pipes, join rearwardly of the upper pipe 13 so as to be continuous therewith in a straight line in a side view.

The frame connecting member 15 is formed, for example, of a casting or a forging, having a front upper end portion integrally joined to the rear side of the lower portion of the head pipe 6. The frame connecting member 15 has a bifurcate lower portion, to which each of the upper end portions of the left and right down pipes 16 is joined. The left and right down pipes 16 are formed, for example, of round steel pipes. In a side view, the down pipes 16 extend in a straight line obliquely downwardly toward the rear from the frame connecting member 15. While, in a front view, the down pipes 16 spread out from the frame connecting member 15 to extend downwardly and then bend to extend downwardly substantially in parallel with the vehicle width direction central plane CS. The cross pipe 17 formed of, for example, a round steel pipe and extending crosswise connects the upper portions of the left and right down pipes 16.

The left and right lower pipes 18 are formed of, for example, round steel pipes that are integrally joined rearwardly to the lower ends of the left and right down pipes 16 and extend substantially horizontally toward the rear in a space downward of the engine 12. The rear end portions of the left and right lower pipes 18 are disposed rearwardly of the engine 12 and downwardly of the rear end portions of the left and right rear upper pipes 14 with a predetermined amount spaced apart therefrom. The left and right pivot brackets 11, which are formed of, for example, a casting or a forging extending vertically, each extend across the rear end portion of the lower pipe 18 on either side and the rear end portion of the rear upper pipe 14 on either side.

The gusset member 19 is formed, for example, of upper and lower split parts formed by a press. The gusset member 19 clamps the rear end portion of the upper pipe 13 and the front end portions of the left and right rear upper pipes 14 and are joined integrally and jointly therewith.

The sub-upper pipe 20 is formed of, for example, a round steel pipe and disposed, similarly to the upper pipe 13, singly at the vehicle width direction center. The sub-upper pipe 20 has a central axis (not shown) disposed on the vehicle width direction central plane CS. The sub-upper pipe 20 extends substantially horizontally, having a front end portion joined to the rear portion of the frame connecting member 15 and a rear end portion joined to a lower portion of the gusset member 19. The sub-upper pipe 20 thereby reinforces areas around the head pipe 6, thus achieving stiffness mainly in the vertical direction.

A fuel tank 21 is disposed upwardly of, and to extend over, the rear portion of the upper pipe 13, the gusset member 19, and the front portions of the left and right rear upper pipes 14. A seat 22 for a rider is disposed rearwardly of the fuel tank 21 (and upwardly of the rear portions of the left and right rear upper pipes 14). A tandem seat 23 for a rear portion passenger that is disposed at a rear portion of the seat 22 and continuous rearwardly thereto is disposed upwardly of left and right seat frames 11a that are joined rearwardly and upwardly to the left and right pivot brackets 11.

The engine 12 is a narrow-angle V-shaped, two-cylinder engine with a crank axis extending in the crosswise direction. The engine 12 has a basic configuration of front and rear cylinders 25, 26 standing on top of a front portion of a crankcase 24. An intake system 27 including, for example, a throttle body is disposed between the front and rear cylinders 25, 26. An exhaust pipe 28 extends from each of a front portion of the front cylinder 25 and a rear portion of the rear cylinder 26. Each of the exhaust pipes 28 is routed along the right-hand side of the rear portion of the vehicle body and connected to a silencer 29 disposed on the right of the rear wheel 8.

A steering damper 30 that gives the steering system 7A a predetermined damping force during clockwise or counter-clockwise rotation of the steering system 7A is disposed immediately downwardly of the sub-upper pipe 20.

The steering damper 30 is formed to include a tubular damper 31 and a linkage mechanism 41. Specifically, the tubular damper 31 serves as a damper main unit. The linkage mechanism 41 connects the tubular damper 31 to the steering system 7A (bottom bridge 4b). More specifically, the tubular damper 31 is formed to include a cylindrical damper cylinder 32 packed therein with, for example, oil or compressed gas and a piston rod 33 extending integrally from a piston (not shown) that slides in the damper cylinder 32. The tubular damper 31 is disposed such that a central axis C2 thereof (in an extending and contracting direction) extends substantially in parallel with a longitudinal direction of the sub-upper pipe 20 (along a fore-aft direction or substantially horizontally).

Figure 5A:
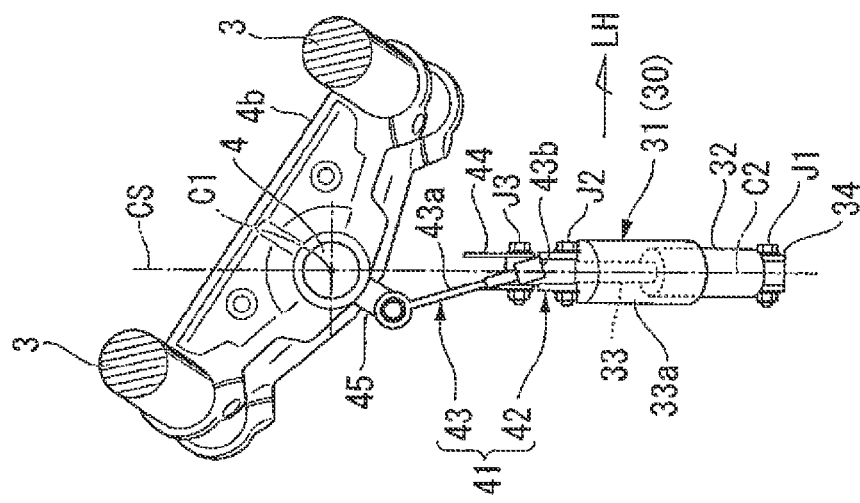
FIGS. 5A, 5B, and 5C are bottom views to extend along an axis of a head pipe, showing the steering damper and parts disposed therearound, FIG. 5A showing a condition of a steering angle of 0 degrees, FIG. 5B showing a condition of the handlebar being turned fully clockwise, and FIG. 5C showing a condition of the handlebar being turned fully counterclockwise.
Figure 5B:
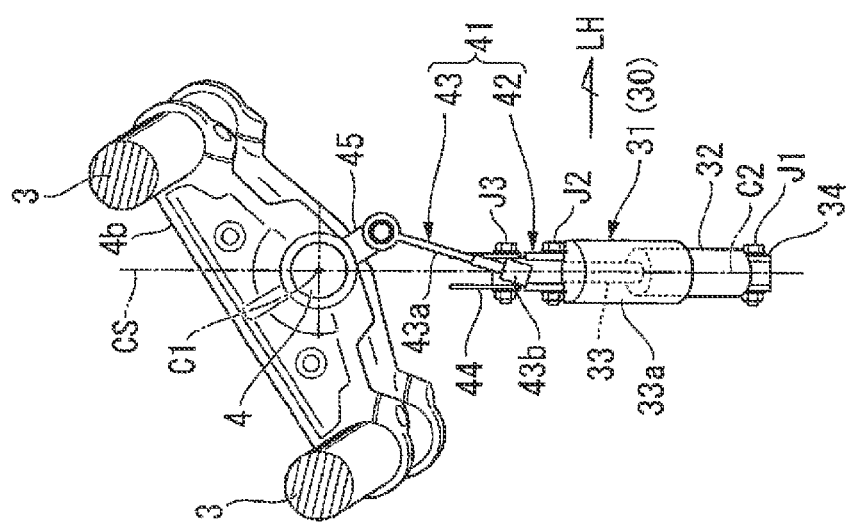
Figure 5C:
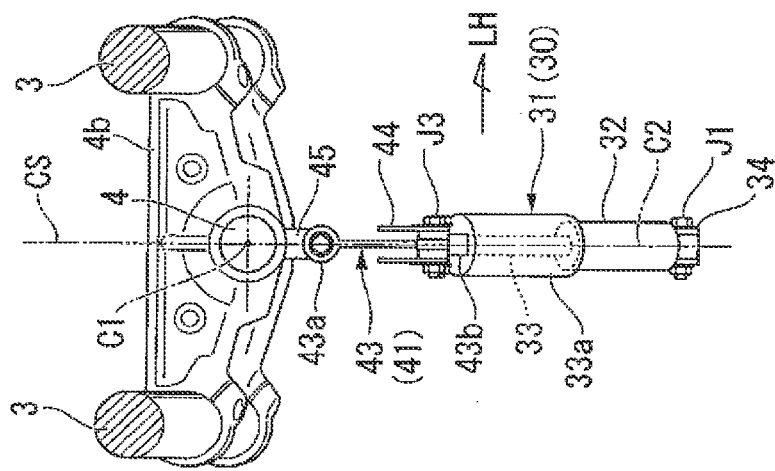

The steering damper 30 in a condition, in which the steering angle of the steering system 7A is 0 degrees (in a neutral position or in a straight-ahead position) unless otherwise noted, will be described below with reference to FIGS. 2 and 5A.

The tubular damper 31 (damper cylinder 32) has a rear end portion rotatably supported on a rear frame stay 34 that protrudes downwardly from the rear end portion of the upper pipe 13 (gusset member 19) via a first connecting shaft J1 that extends in the crosswise direction. In addition, the tubular damper 31 (piston rod 33) has a front end portion rotatably supported on a linkage member 42 of the linkage mechanism 41 via a second connecting shaft J2 that extends again in the crosswise direction.

The linkage member 42 has a proximal portion 42a rotatably supported on a front frame stay 44 that protrudes obliquely downwardly toward the rear from a crosswise center of the lower portion of the frame connecting member 15 via a third connecting shaft J3 that extends in the crosswise direction. The linkage member 42 is formed substantially into an L-shape in a side view, including a damper connecting arm 42b that extends obliquely upwardly toward the rear from the proximal portion 42a and a rod connecting arm 42c that extends obliquely downwardly toward the rear from the proximal portion 42a. The linkage member 42 may, instead, be arcuate or in a straight line in a side view. The rod connecting arm 42c has an arm length shorter than that of the damper connecting arm 42b.

The linkage mechanism 41 is formed to include the linkage member 42 and a link rod 43 that extends across the rod connecting arm 42c of the linkage member 42 and a bottom stay 45 protruding obliquely downwardly toward the rear from a crosswise center of the rear portion of the bottom bridge 4b. The link rod 43 has a straight line shape that inclines downwardly toward the rear. Front and rear ball joints 43a, 43b (spherical joints) are disposed at front and rear end portions, respectively, of the link rod 43.

The link rod 43 has the rear end portion connected oscillatably and rotatably on a lower side at a leading end portion of the rod connecting arm 42c via the rear ball joint 43b. The link rod 43 has the front end portion connected oscillatably and rotatably to a lower side of the bottom stay 45 via the front ball joint 43a.

The tubular damper 31 is disposed so as to be located in a space (to state it differently, in a space between the upper pipe 13 and the upper portions of the left and right down pipes 16) K that is immediately below the sub-upper pipe 20. The tubular damper 31 is disposed so as to extend in parallel with the sub-upper pipe 20 and such that the axis C2 thereof is located on the vehicle width direction central plane CS.

The tubular damper 31 is in the most extended state when the steering system 7A is in the neutral position. When the steering system 7A is turned clockwise or counterclockwise from the neutral position, the linkage mechanism 41 acts to let the piston rod 33 advance into the damper cylinder 32, so that the tubular damper 31 is contracted (see FIGS. 3, 4, 5B, and 5C).

The tubular damper 31 generates a damping force during this contracting operation, which dampens rotation of the steering system 7A. When the steering system 7A returns to the neutral position from a turned position, the tubular damper 31 extends while causing the piston rod 33 to be retracted from the inside of the damper cylinder 32. During this extending operation, the tubular damper 31 also generates a damping force.

The extension and contraction of the tubular damper 31 involved in the rotation of the steering system 7A is accomplished in the space K between the upper pipe 13 and the down pipes 16 in a side view.

Note that the tubular damper 31 may be a double action type that generates the damping force during both extension and contraction, or a single action type that generates the damping force only during the extension or contraction. Additionally, the tubular damper 31 according to the first embodiment of the present invention is a free piston type or a bladder type of liquid-vapor separation, though details are not shown in drawings. Even with the tubular damper 31 disposed substantially horizontally, therefore, liquid and vapor are not mixed with each other, so that there is no change in the damping force. Specifically, the degree of freedom in layout of the tubular damper 31 is enhanced.

Figure 3:
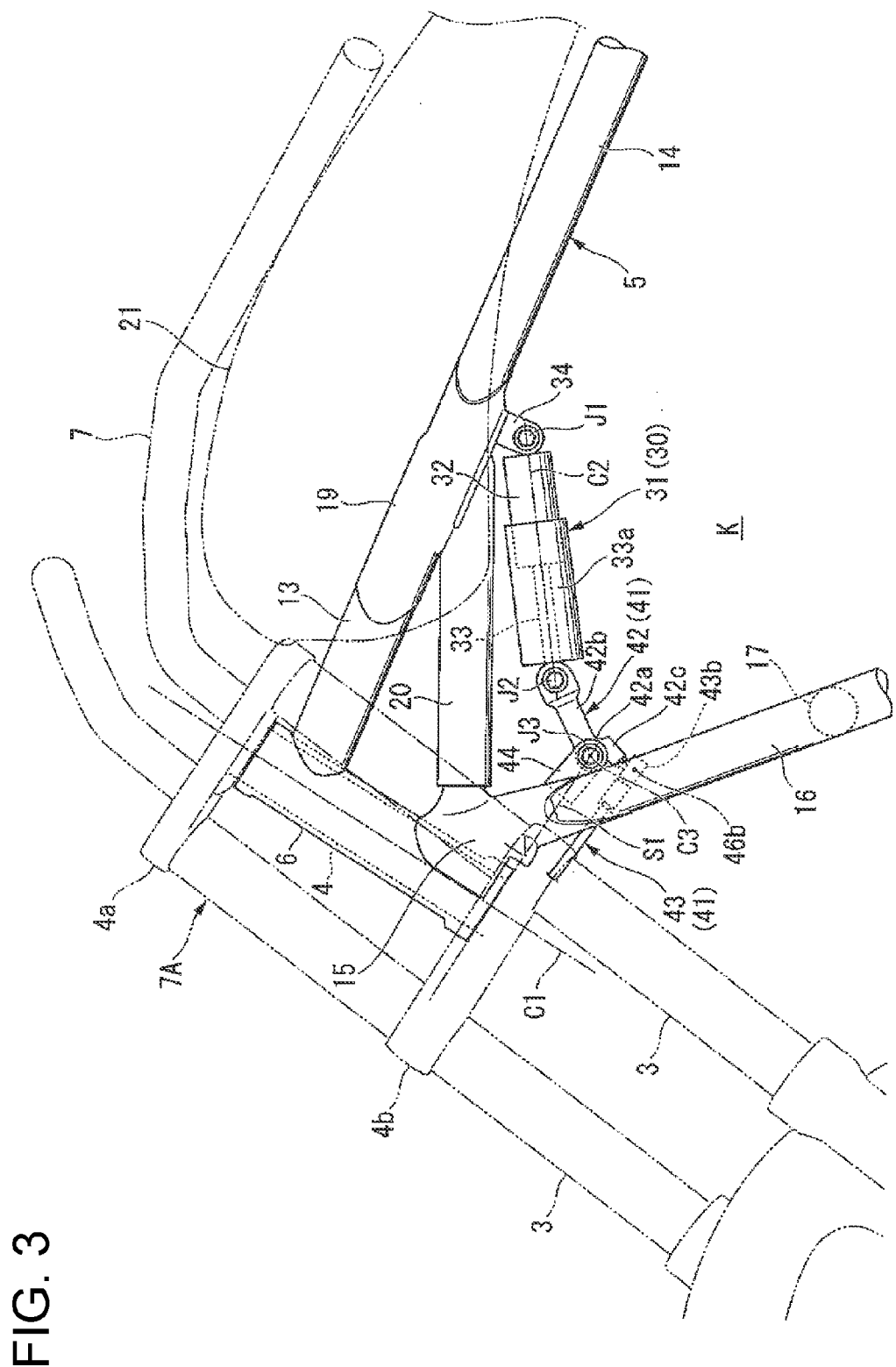
FIG. 3 is a left side elevational view showing the steering damper and parts disposed therearound in a condition of a handlebar being turned fully counterclockwise in the motorcycle.
Figure 4:
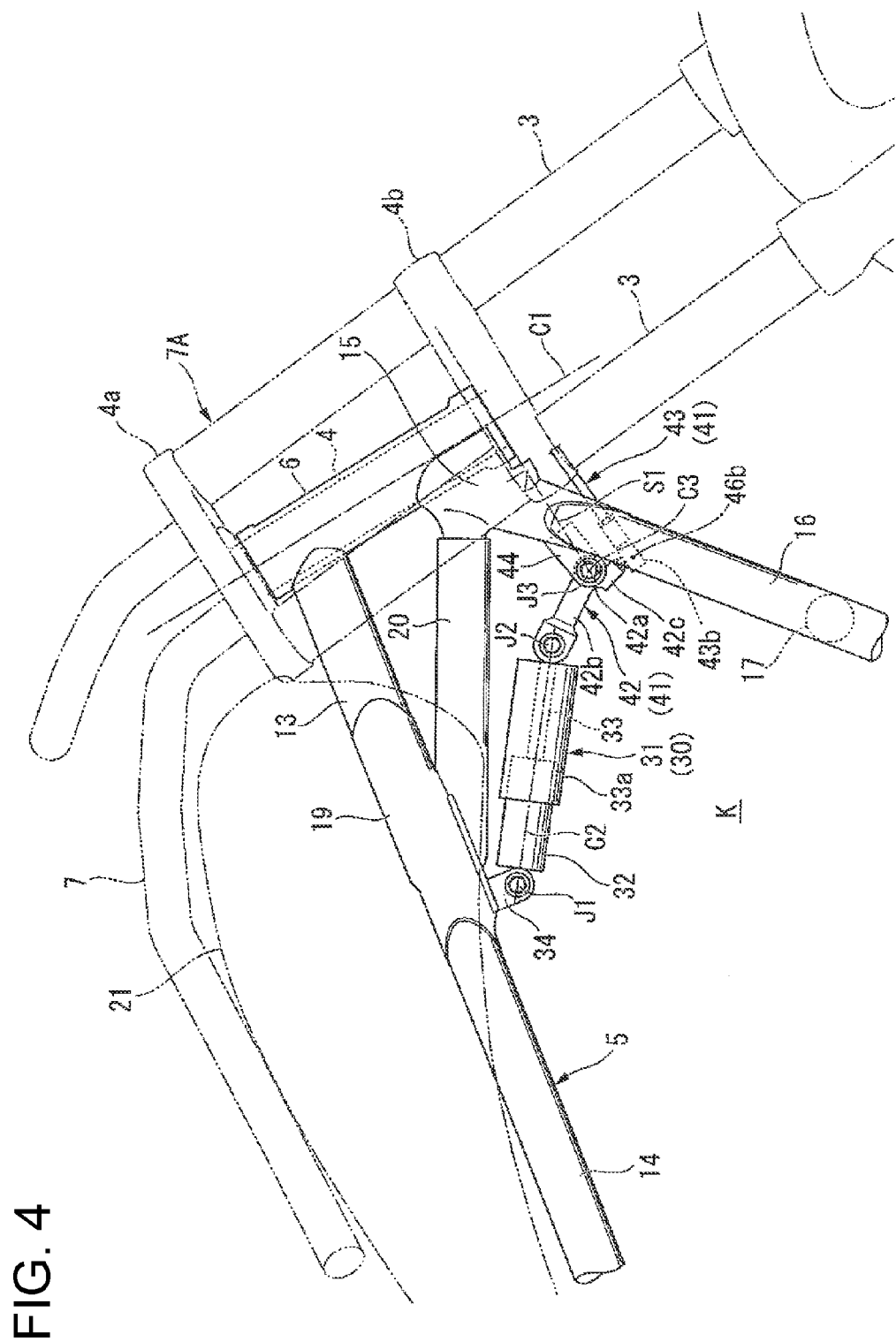
FIG. 4 is a right side elevational view showing the steering damper and parts disposed therearound in a condition of the handlebar being turned fully clockwise in the motorcycle.

Referring to FIGS. 2 to 4, the link rod 43 is disposed such that a longitudinal direction thereof (a direction of a straight line connecting between center points of oscillation of the front and rear ball joints 43a, 43b (between a connecting point 46a relative to the bottom bridge 4b and a connecting point 46b relative to the linkage member 42)) is substantially orthogonal to the axis C1 of the head pipe 6 in a side view (to state it differently, such that each of the connecting points 46a, 46b is on a single plane that is substantially orthogonal to the axis C1 of the head pipe 6).

Additionally, the link rod 43 is disposed so as to be positioned downwardly, in a side view, in a direction extending along the axis C1 relative to a plane S1 that is substantially orthogonal to the axis C1 of the head pipe 6 and passes through a central axis of rotation C3 of the linkage member 42 (central axis of the connecting shaft).

When the steering system 7A is turned clockwise or counterclockwise, the tubular damper 31 tilts so as to move a front side thereof (on the side of the piston rod 33) downwardly as the linkage member 42 rotates (see FIGS. 3 and 4). This results in the tubular damper 31 tilting downwardly toward the front, which eliminates the likelihood that the front end portion in the damper cylinder 32 through which the piston rod 33 is passed will face upward. In addition, a rod cover 33a that covers a portion extending from the piston rod 33 to a front portion of the damper cylinder 32 has a front end opening that is not open forwardly of the vehicle. This eliminates the likelihood that the rod cover 33a will be turned out by an air flow or, for example, rainwater will be accumulated inside the rod cover 33a. Note that FIGS. 3 and 4 show conditions, in which the steering system 7A is turned fully counterclockwise and fully clockwise, respectively.

Additionally, the tubular damper 31 has the rod cover 33a having a larger diameter than the damper cylinder 32 disposed on the front side. This provides a clearance from the engine 12 disposed downwardly of the tubular damper 31.

The steering damper 30 is adapted such that, regardless of whether the steering system 7A is turned clockwise or counterclockwise, the tubular damper 31 extends or contracts the same amount during the clockwise or counterclockwise turn, as long as the steering angle of the steering system 7A remains the same. Specifically, the steering damper 30 is adapted such that, regardless of whether the steering system 7A is turned clockwise or counterclockwise, a damping characteristic of the steering system 7A achieved by the damping force of the tubular damper 31 is symmetrical.

In addition, the tubular damper 31 has a characteristic that varies the damping force at a predetermined rate according to an extension/contraction speed thereof. The linkage mechanism 41 interposed between the tubular damper 31 and the steering system 7A allows the extension/contraction speed (damping characteristic) of the tubular damper 31 to be variable relative to a steering speed of the steering system 7A. Specifically, the following damping characteristic can be achieved: specifically, when, for example, the steering angle is near 0 degrees, an extension/contraction amount of the tubular damper 31 relative to the steering angle is made small to decrease the damping force; when the steering angle is large, the extension/contraction amount of the tubular damper 31 relative to the steering angle is made large to increase the damping force. It is further possible to vary such a damping characteristic smoothly and continuously.

As described heretofore, the steering damper device for the saddle riding type vehicle according to the first embodiment of the present invention is applied to the motorcycle 1 that includes: the head pipe 6 for allowing the stem pipe 4 to pass therethrough and holding the stem pipe 4 therein rotatably about an axis thereof; the upper pipe 13 extending rearwardly from the head pipe 6, the pair of left and right down pipes 16 extending downwardly from the head pipe 6, the bottom bridge 4b for rotating with the stem pipe 4; and the steering damper 30 giving a damping force to rotation of the stem pipe 4. The steering damper 30 has the tubular damper 31 that includes the cylindrical damper cylinder 32 and the piston rod 33 that is slidably passed through the damper cylinder 32. The damper cylinder 32 is supported by the upper pipe 13. In this steering damper device, the tubular damper 31 is disposed such that the axis C2 thereof is disposed on the vehicle width direction central plane CS; the tubular damper 31 extends or contracts as the bottom bridge 4b rotates; and the tubular damper 31 extends or contracts in the space K between the upper pipe 13 and the down pipes 16 in a side view.

According to the foregoing arrangements, the steering damper 30 is disposed on the vehicle width direction central plane CS. This eliminates any difference in the damping force between the clockwise and counterclockwise turns during clockwise or counterclockwise rotation of the steering system, so that the damping characteristic can be evenly maintained for the clockwise and counterclockwise turns.

Additionally, the tubular damper 31 is disposed in a relatively spacious site between the upper pipe 13 and the down pipes 16. The degree of freedom in the layout of the steering damper 30 can be enhanced to suit the need of each individual vehicle. The degree of freedom in the layout of vehicle components around the head pipe 6 can also be achieved.

In addition, in the above-described steering damper device, the steering damper 30 includes the linkage mechanism 41 that connects the bottom bridge 4b and the tubular damper 31. By changing the linkage mechanism 41, therefore, the degree of freedom in setting a damper ratio can be enhanced, which achieves an optimum damper ratio to suit characteristics of each individual vehicle.

In the above-described steering damper device, the linkage mechanism 41 includes the link rod 43 that extends rearwardly from the bottom bridge 4b and the linkage member 42 that connects the tubular damper 31 to the link rod 43. This allows the linkage mechanism 41 to be disposed also between the upper pipe 13 and the down pipes 16.

The above-described steering damper device includes the sub-upper pipe 20 that extends in the fore-aft direction so as to connect the upper pipe 13 and the head pipe 6. The tubular damper 31 is disposed so as to extend along the sub-upper pipe 20. Even in a vehicle having the sub-upper pipe 20 disposed close to the engine 12 with no space therebetween, the tubular damper 31 can be disposed to extend along the sub-upper pipe 20, thus allowing a space for disposing the tubular damper 31 to be reduced.

In the above-described steering damper device, the linkage member 42 has the central axis of rotation C3 that extends in parallel with the vehicle width direction and the connecting point 46b between the link rod 43 and the linkage member 42 is disposed downwardly of the plane S1 that passes through the central axis of rotation C3 of the linkage member 42 and is perpendicular to the stem pipe 4. Even in a vehicle having the sub-upper pipe 20 disposed close to the engine 12 with no space therebetween, a clearance can be secured between the sub-upper pipe 20 and the steering damper 30.

Additionally, the above-described steering damper device includes the bottom stay 45 that protrudes rearwardly from the crosswise center of the rear portion of the bottom bridge 4b. A front end of the link rod 43 is connected to the bottom stay 45 and the linkage member 42 is connected to a rear end of the link rod 43. This extends a distance between the axis of the stem pipe 4 and the connecting point 46a at the front end of the link rod 43, so that the tubular damper 31 can have a longer extension/contraction stroke.

[Second Embodiment]

Figure 6:
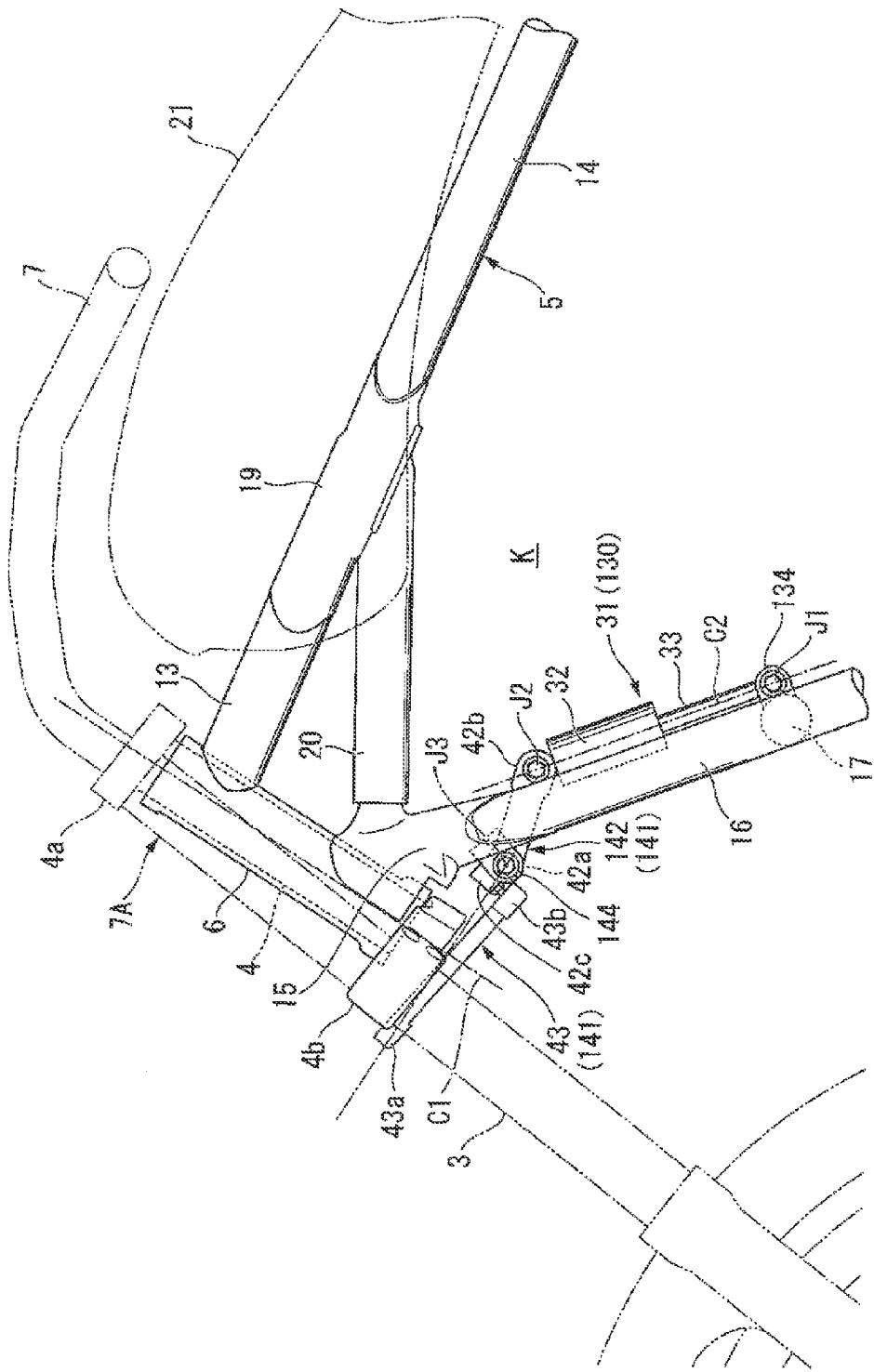
FIG. 6 is a left side elevational view showing a second embodiment of the present invention, corresponding to FIG. 2.

A second embodiment of the present invention will be described below with reference to FIG. 6.

The second embodiment of the present invention differs from the first embodiment of the present invention mainly in that a steering damper 130 is structured to include a tubular damper 31 disposed along a down pipe 16 in a side view and such that the tubular damper 31 has a lower end portion supported on a cross pipe 17. Like or corresponding parts are identified by the same reference numerals as those used for the first embodiment of the present invention and descriptions for those parts will be omitted.

The steering damper 130 in a condition, in which the steering angle of a steering system 7A is 0 degrees (in a neutral position or in a straight-ahead position) unless otherwise noted, will be described below.

The tubular damper 31 according to the second embodiment of the present invention is disposed in an inclined position so as to extend substantially in parallel with the down pipe 16 in a side view and so that an upper side thereof is disposed forwardly. The tubular damper 31 has a front edge side disposed so as to overlap the down pipe 16 in a side view and a rear edge side disposed inside the space K. The tubular damper 31 has a central axis C2 disposed on the vehicle width direction central plane CS. The tubular damper 31 does not have the rod cover 33a described with reference to the first embodiment of the present invention.

The tubular damper 31 (piston rod 33) has a lower end portion supported rotatably via a first connecting shaft J1 on a lower frame stay 134 that protrudes from a crosswise center of the cross pipe 17. The tubular damper 31 (damper cylinder 32) has an upper end portion connected rotatably to a linkage member 142 of a linkage mechanism 141 via a second connecting shaft J2.

The linkage member 142 has a proximal portion 42a supported rotatably via a third connecting shaft J3 on an upper frame stay 144 that protrudes from a crosswise center of a lower portion of a frame connecting member 15. The linkage member 142 further includes a damper connecting arm 42b that extends obliquely downwardly toward the rear from the proximal portion 42a and a rod connecting arm 42c that extends obliquely upwardly toward the front from the proximal portion 42a.

The linkage mechanism 141 is formed to include the linkage member 142 and a link rod 43 that extends across the rod connecting arm 42c of the linkage member 142 and a crosswise center of a front portion of a bottom bridge 4b.

In the steering damper 130, the tubular damper 31 is in the most contracted state when the steering system 7A is in the neutral position. When the steering system 7A is turned clockwise or counterclockwise from the neutral position, the linkage mechanism 141 acts to let the tubular damper 31 extend. The tubular damper 31 generates a damping force during this extension operation, which dampens rotation of the steering system 7A.

The tubular damper 31 contracts when the steering system 7A is returned to the neutral position from the clockwise or counterclockwise turned position, at which time the tubular damper 31 generates a damping force, too.

The extension and contraction operations of the tubular damper 31 are performed across a space between the left and right down pipes 16 and the space K that is formed, in a side view, between the upper pipe 13 and the down pipes 16.

The steering damper 130 is adapted such that, regardless of whether the steering system 7A is turned clockwise or counterclockwise, the tubular damper 31 extends or contracts the same amount during the clockwise or counterclockwise turn, as long as the steering angle of the steering system 7A remains the same. Specifically, the steering damper 130 is adapted such that, regardless of whether the steering system 7A is turned clockwise or counterclockwise, the damping characteristic of the steering system 7A achieved by the damping force of the tubular damper 31 is symmetrical.

The linkage mechanism 141 interposed between the tubular damper 31 and the steering system 7A allows the extension/contraction speed (damping characteristic) of the tubular damper 31 to be variable relative to the steering speed of the steering system 7A. Such a damping characteristic can also be varied smoothly and continuously.

As described heretofore, the steering damper device for the saddle riding type vehicle according to the second embodiment of the present invention also achieves the following effects. Specifically, the steering damper 130 is disposed on the vehicle width direction central plane CS. This eliminates any difference in the damping force between the clockwise and counterclockwise turns during clockwise or counterclockwise rotation of the steering system, so that the damping characteristic can be evenly maintained for the clockwise and counterclockwise turns. In addition, by changing the linkage mechanism 141, the degree of freedom in setting the damper ratio can be enhanced. Further, the space for placing the tubular damper 31 can be secured even in a vehicle having the sub-upper pipe 20, the down pipes 16, and the engine 12 disposed close to each other with no space available therebetween.

In the above-described steering damper device, the cross pipe 17 is disposed between the left and right down pipes 16 and the tubular damper 31 is supported on the cross pipe 17.

Even if the damper device has the down pipes 16 in pairs, the steering damper 130 can be easily disposed in the center of the vehicle width direction by disposing the tubular damper 31 on the cross pipe 17.

It should be understood that the embodiments of the present invention are not limited to the above-described embodiments. Rather, for example, the damper cylinder 32 and the piston rod 33 of the tubular damper 31 may be disposed the other way around in each of the first and second embodiments. In addition, each part of the vehicle body frame 5 may have, for example, a rectangular cross-sectional shape, instead of the round cross-sectional shape, or may be formed, for example, of a press-formed or extruded part, in addition to the steel pipe, or of a casting or a forging.

Although the foregoing describes the exemplary preferred embodiments, various changes in form and detail may be made therein without departing from the spirit and scope of the invention.

The saddle riding type vehicle as the term herein used is a concept that includes general vehicles, in which a rider straddles a vehicle body thereof to ride, encompassing not only a motorcycle (including a motorized bicycle and a scooter type vehicle), but also a three-wheeled (including a vehicle having two front wheels and one rear wheel, in addition to one having one front wheel and two rear wheels) or a four-wheeled vehicle.

According to the embodiment of the present invention, the steering damper is disposed on the vehicle width direction central plane. This eliminates any difference in the damping force between the clockwise and counterclockwise turns during clockwise or counterclockwise rotation of the steering system, so that the damping characteristic can be evenly maintained for the clockwise and counterclockwise turns. Additionally, the tubular damper is disposed in a relatively spacious site between the upper frame and the down frames. The degree of freedom in the layout of the steering damper can be enhanced to suit the need of each individual vehicle. The degree of freedom in the layout of vehicle components around the head pipe can also be achieved.

According to the embodiment of the present invention, by changing the linkage mechanism, the degree of freedom in setting a damper ratio can be enhanced, which achieves an optimum damper ratio to suit characteristics of each individual vehicle.

According to the embodiment of the present invention, the linkage mechanism can also be disposed between the upper frame and the down frames.

According to the embodiment of the present invention, even in a vehicle having the sub-upper pipe disposed close to the engine with no space therebetween, the tubular damper can be disposed to extend along the sub-upper pipe, thus allowing a space for disposing the tubular damper to be reduced.

According to the embodiment of the present invention, even in a vehicle having the sub-upper pipe disposed close to the engine with no space therebetween, a clearance can be secured between the sub-upper pipe and the steering damper.

According to the embodiment of the present invention, even if the damper device has the down frames in pairs, the steering damper can be easily disposed in the center of the vehicle width direction by disposing the tubular damper on the cross pipe.

According to the embodiment of the present invention, a distance between the axis of the steering shaft and the connecting point at the front end of the link rod can be made long, so that the tubular damper can have a longer extension/contraction stroke.

Obviously, numerous modifications and variations of the present invention are possible in light of the above teachings. It is therefore to be understood that within the scope of the appended claims, the invention may be practiced otherwise than as specifically described herein.

The invention claimed is:

1. A steering damper device for a saddle riding vehicle, the steering damper device giving a damping force to rotate a steering shaft of the saddle riding vehicle and comprising:
   a tubular damper including a cylindrical damper cylinder and a piston rod slidably passed through the damper cylinder, either the damper cylinder or the piston rod being supported on an upper frame or a down frame of the saddle riding vehicle, the upper frame extending rearwardly from a head pipe through which the steering shaft passes and which holds the steering shaft therein rotatably about an axis of the steering shaft, the down frame extending downwardly from the head pipe, and the steering shaft rotating with a bottom bridge;
   a linkage mechanism to connect the bottom bridge to the tubular damper; and
   a sub-upper pipe extending in a fore-aft direction so as to connect the upper frame and the head pipe through a frame connecting member,
   wherein the tubular damper is disposed such that an axis thereof is disposed on a vehicle width direction central plane,
   wherein the tubular damper extends or contracts as the bottom bridge rotates,
   wherein the tubular damper extends or contracts within a space between the upper frame and the down frame in a side view, and
   wherein the tubular damper is disposed so as to extend along the sub-upper pipe.

2. The steering damper device for the saddle riding vehicle according to claim 1, wherein the linkage mechanism includes
   a link rod extending rearwardly from the bottom bridge and
   a linkage member to connect the tubular damper to the link rod.

3. The steering damper device for the saddle riding vehicle according to claim 2,
   wherein the linkage member has an axis of rotation that extends in parallel with a vehicle width direction, and
   wherein a connecting point between the link rod and the linkage member is disposed downwardly of a plane that passes through the axis of rotation of the linkage member and that is perpendicular to the steering shaft.

4. The steering damper device for the saddle riding vehicle according to claim 2, further comprising:
   a cross pipe extending across a pair of left and right frames, the down frame including the pair of left and right frames, and the pair of left and right frames extending downwardly from the head pipe,
   wherein the tubular damper is supported on the cross pipe.

5. The steering damper device for the saddle riding vehicle according to claim 1, further comprising:
   a cross pipe extending across a pair of left and right frames, the down frame including the pair of left and right frames, and the pair of left and right frames extending downwardly from the head pipe,
   wherein the tubular damper is supported on the cross pipe.

6. A steering damper device for a saddle riding vehicle, the steering damper device giving a damping force to rotate a steering shaft of the saddle riding vehicle and comprising:
   a tubular damper including a cylindrical damper cylinder and a piston rod slidably passed through the damper cylinder, either the damper cylinder or the piston rod being supported on an upper frame or a down frame of the saddle riding vehicle, the upper frame extending rearwardly from a head pipe through which the steering shaft passes and which holds the steering shaft therein rotatable about an axis of the steering shaft, the down frame extending downwardly from the head pipe, and the steering shaft rotating with a bottom bridge;
   a linkage mechanism to connect the bottom bridge to the tubular damper; and
   a cross pipe extending across a pair of left and right frames, the down frame including the pair of left and right frames, and the pair of left and right frames extending downwardly from the head pipe,
   wherein the tubular damper is disposed such that an axis thereof is disposed on a vehicle width direction central plane,
   wherein the tubular damper extends or contracts as the bottom bridge rotates,
   wherein the tubular damper extends or contracts within a space between the upper frame and the down frame in a side view, and
   wherein the tubular damper is supported on the cross pipe.

7. A steering damper device for a saddle riding vehicle, the steering damper device giving a damping force to rotate a steering shaft of the saddle riding vehicle and comprising:
   a tubular damper including a cylindrical damper cylinder and a piston rod slidably passed through the damper cylinder, either the damper cylinder or the piston rod being supported on an upper frame or a down frame of the saddle riding vehicle, the upper frame extending rearwardly from a head pipe through which the steering shaft passes and which holds the steering shaft therein rotatably about an axis of the steering shaft, the down frame extending downwardly from the head pipe, and the steering shaft rotating with a bottom bridge;
   a linkage mechanism to connect the bottom bridge to the tubular damper; and
   a bottom stay protruding rearwardly from a crosswise center of a rear portion of the bottom bridge,
   wherein the tubular damper is disposed such that an axis thereof is disposed on a vehicle width direction central plane,
   wherein the tubular damper extends or contracts as the bottom bridge rotates,
   wherein the tubular damper extends or contracts within a space between the upper frame and the down frame in a side view,
   wherein the linkage mechanism includes a link rod extending rearwardly from the bottom bridge and a linkage member to connect the tubular damper to the link rod, and
   wherein the link rod has a front end connected to the bottom stay and a rear end connected to the linkage member.

8. The steering damper device for the saddle riding vehicle according to claim 7, further comprising:
   a sub-upper pipe extending in a fore-aft direction so as to connect the upper frame and the head pipe through a frame connecting member,
   wherein the tubular damper is disposed so as to extend along the sub-upper pipe.

* * * * *